US009453627B1

(12) United States Patent
Chen

(10) Patent No.: US 9,453,627 B1
(45) Date of Patent: Sep. 27, 2016

(54) SPEAKER WITH LIGHT FLASHING IN FLICKERING FLAME PATTERN

(71) Applicant: Tsan-Yao Chen, Taipei (TW)

(72) Inventor: Tsan-Yao Chen, Taipei (TW)

( * ) Notice: Subject to any disclaimer, the term of this patent is extended or adjusted under 35 U.S.C. 154(b) by 36 days.

(21) Appl. No.: 14/669,755

(22) Filed: Mar. 26, 2015

(51) Int. Cl.

| | |
|---|---|
| ***H04M 1/22*** | (2006.01) |
| ***F21S 10/04*** | (2006.01) |
| ***F21V 33/00*** | (2006.01) |
| ***F21V 23/04*** | (2006.01) |
| ***F21V 14/04*** | (2006.01) |
| ***F21V 23/00*** | (2015.01) |
| *F21Y 101/02* | (2006.01) |

(52) U.S. Cl.

CPC .............. *F21S 10/046* (2013.01); *F21V 14/04* (2013.01); *F21V 23/009* (2013.01); *F21V 23/0442* (2013.01); *F21V 33/0056* (2013.01); *F21Y 2101/02* (2013.01)

(58) Field of Classification Search

CPC .............. F21S 10/046; F21V 33/0056; F21V 23/0442; F21V 14/04; F21V 23/009; F21V 23/0052; F21Y 2101/02; A63J 15/00; G02B 27/00

USPC ................. 362/86, 87, 88, 206.01, 297, 241

See application file for complete search history.

(56) References Cited

U.S. PATENT DOCUMENTS

2007/0125367 A1* 6/2007 Lim ........................ F24C 7/004 126/540

2009/0126241 A1* 5/2009 Asofsky .................. G09F 19/12 40/428

2010/0229849 A1* 9/2010 Asofsky .................. F24C 7/004 126/500

* cited by examiner

*Primary Examiner* — Anh Mai

*Assistant Examiner* — Glenn Zimmerman

(74) *Attorney, Agent, or Firm* — Muncy, Geissler, Olds & Lowe, P.C.

(57) ABSTRACT

A speaker with light flashing in a flickering flame pattern is revealed. In the speaker, light emitted from a light unit is reflected to a display surface and shown in the flickering flame pattern. Once music is played, the speaker is activated to show the light flashing in the flickering flame pattern. When the music tempo changes, the light flashing in the flickering flame pattern with different area and different colors is shown on the display surface.

12 Claims, 5 Drawing Sheets

SPEAKER WITH LIGHT FLASHING IN FLICKERING FLAME PATTERN

BACKGROUND OF THE INVENTION

1. Fields of the Invention

The present invention relates to a speaker, especially to a speaker with light flashing in a flickering flame pattern.

2. Descriptions of Related Art

Besides playing sounds, speakers are used for entertainment or as ornaments. The structure of the speaker is improved constantly for convenience in use. For example, the speaker includes a light module that emits light along with different sounds played under control of a control circuit. Thus the speaker provides various visual and audio effects and looks like a merry-go-around.

However, conventional speakers don't have light flashing in the flickering flame pattern.

SUMMARY OF THE INVENTION

Therefore it is a primary object of the present invention to provide a speaker with light that flashes in a pattern of flickering flame.

It is another object of the present invention to provide a speaker with light flashing in a flickering flame pattern that features on durability and portability.

In order to achieve the above objects, a speaker with light flashing in the flickering flame pattern of the present invention includes a housing, a first light unit, a first reflection unit, an audio unit, a control unit and a drive device. The housing has at least one display surface. The first light unit used for emitting light is disposed in the housing. The first reflection unit is mounted in the housing and having a first rotating shaft and a plurality of first reflectors. The first rotating shaft and the first light unit are arranged with an interval therebetween. The first reflectors are arranged axially at the first rotating shaft in a staggered pattern so as to be driven by the first rotating shaft to rotate synchronously with the first rotating shaft. The first reflectors reflect the light to the display surface shown in a flickering flame pattern. The audio unit is set in the housing and used for playing music and output of an audio signal. The control unit is mounted in the housing and receiving the audio signal. Then the control unit provides at least one drive signal according to changes of the audio signal to make the first light unit emit light and activate the drive device. Thus the first rotating shaft and the first reflectors are driven to rotate. The light is reflected to the display surface by the first reflectors and the light is shown on the display surface in the flickering flame pattern.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
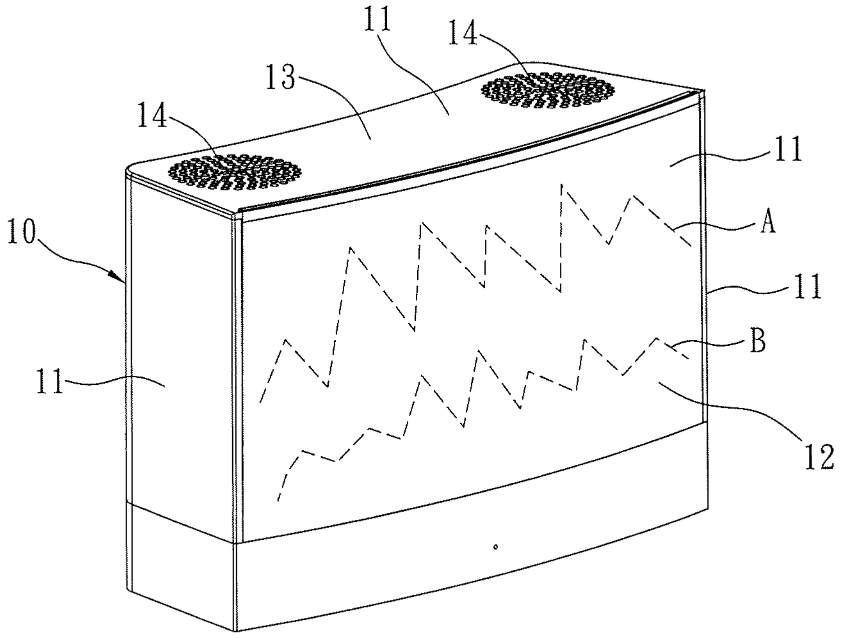
FIG. 1 is a perspective view of an embodiment according to the present invention.

Refer from FIG. 1 to FIG. 4, a speaker with light flashing in a flickering flame pattern of the present invention in which light emitted is shown like flickering flame is formed by a housing 10, a first light unit 20, a first reflection unit 30, an audio unit 40, a control unit 50 and a drive device 60.

Figure 9:
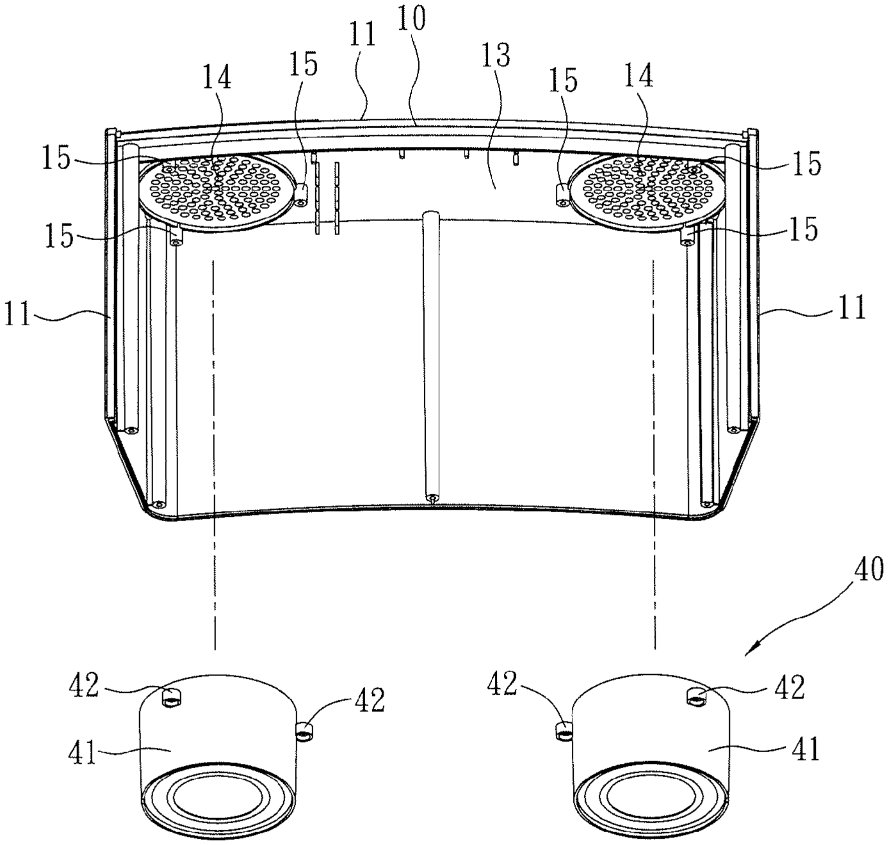
FIG. 9 is a perspective view of an embodiment in which an housing and an audio unit are separated according to the present invention.

Refer to FIG. 1, the housing 10 consists of a plurality of surfaces 11. One of the surfaces 11 is used as a display surface 12 which light can pass through and show thereon. In the embodiments shown in FIG. 1, FIG. 2, and FIG. 9, a top surface 13 of the housing 10 is arranged with sound apertures 14 penetrating thereof. As shown in FIG. 9, a plurality of locking parts 15 is disposed on an inner side of the top surface 13 of the housing 10.

Figure 4:
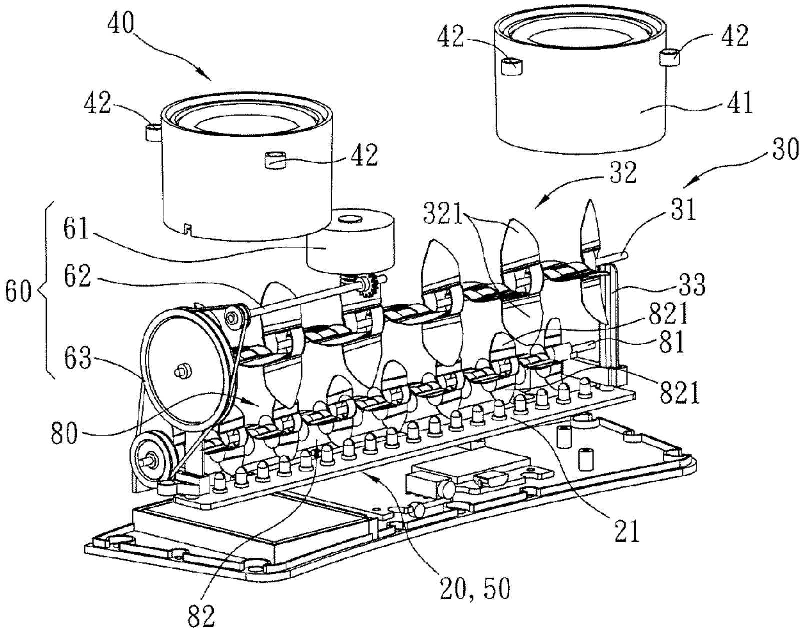
FIG. 4 is a perspective view of the embodiment in FIG. 3 viewed from opposite side according to the present invention.

As shown in FIG. 4, the first light unit 20 is mounted in the housing 10 and used to emit light A. The first light unit 20 includes at least one LED light panel 21 with a plurality of LED lights to generate light with at least one color.

Figure 3:
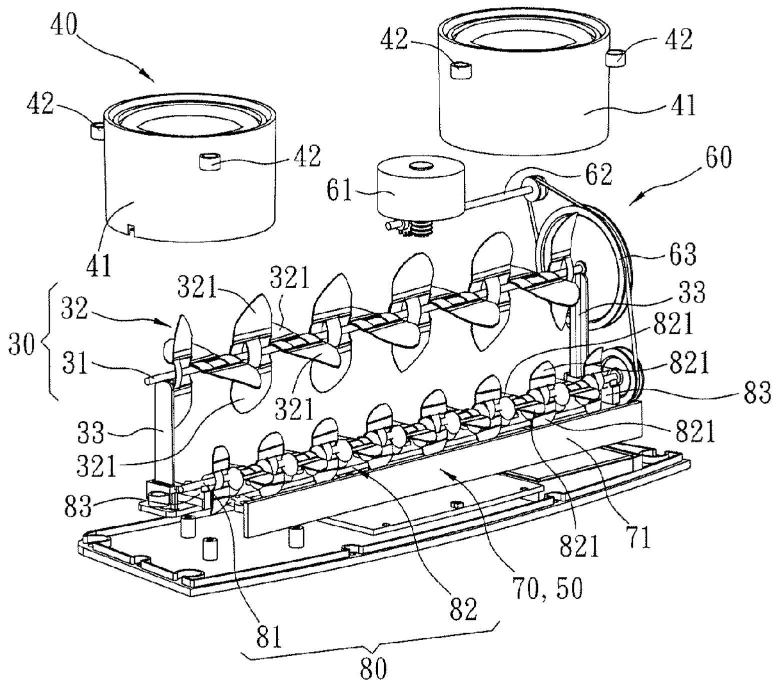
FIG. 3 is a perspective view of the embodiment in FIG. 2 without a housing according to the present invention.
Figure 5:
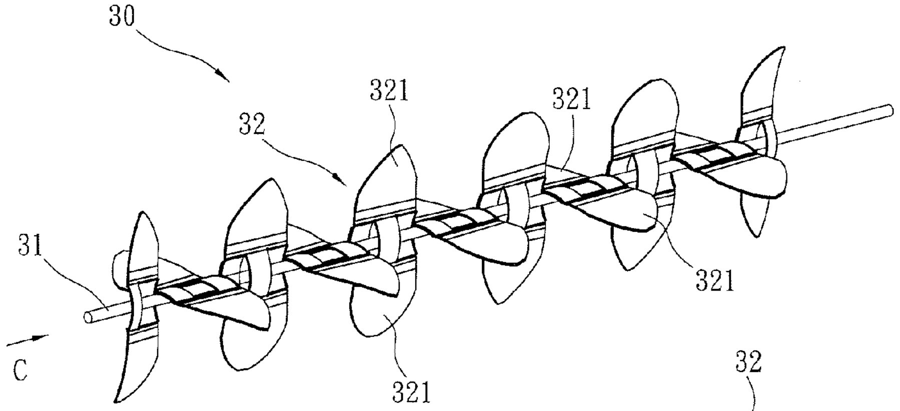
FIG. 5 is a perspective view of a first reflection unit of an embodiment according to the present invention.
Figure 6:
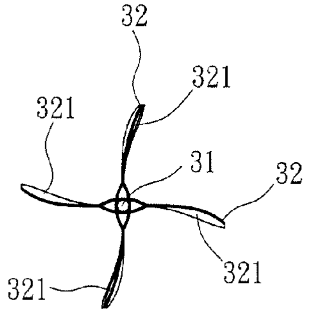
FIG. 6 is a side view of the first reflection unit in FIG. 5 viewed in the direction the arrow C indicates according to the present invention.

Refer to FIG. 3, the first reflection unit 30 is mounted in the housing 10 and having a first rotating shaft 31 and a plurality of first reflectors 32. The first rotating shaft 31 is disposed on a first rack 33 and having a certain interval with the first light unit 20. For example, the first rotating shaft 31 can be arranged over the first light unit 20, but not limited to the position. The first reflectors 32 are arranged axially at the first rotating shaft 31 in a staggered pattern so that the first reflectors 32 are driven by the first rotating shaft 31 to rotate synchronously while the first rotating shaft 31 is rotated. As shown in FIG. 5 and FIG. 6, the first reflectors 32 are disposed alternately in a cross pattern viewed axially in the direction of the first rotating shaft 31. Each first reflector 32 includes at least one concave surface 321 used for reflecting light A emitted from the first light unit 20. The concave surface 321 is a concave mirror whose surface is curved inward. Thus the light A emitted from the first light unit 20 is reflected by the first reflectors 32 to be displayed on the display surface 12 and flashing in a flickering flame pattern.

Figure 2:
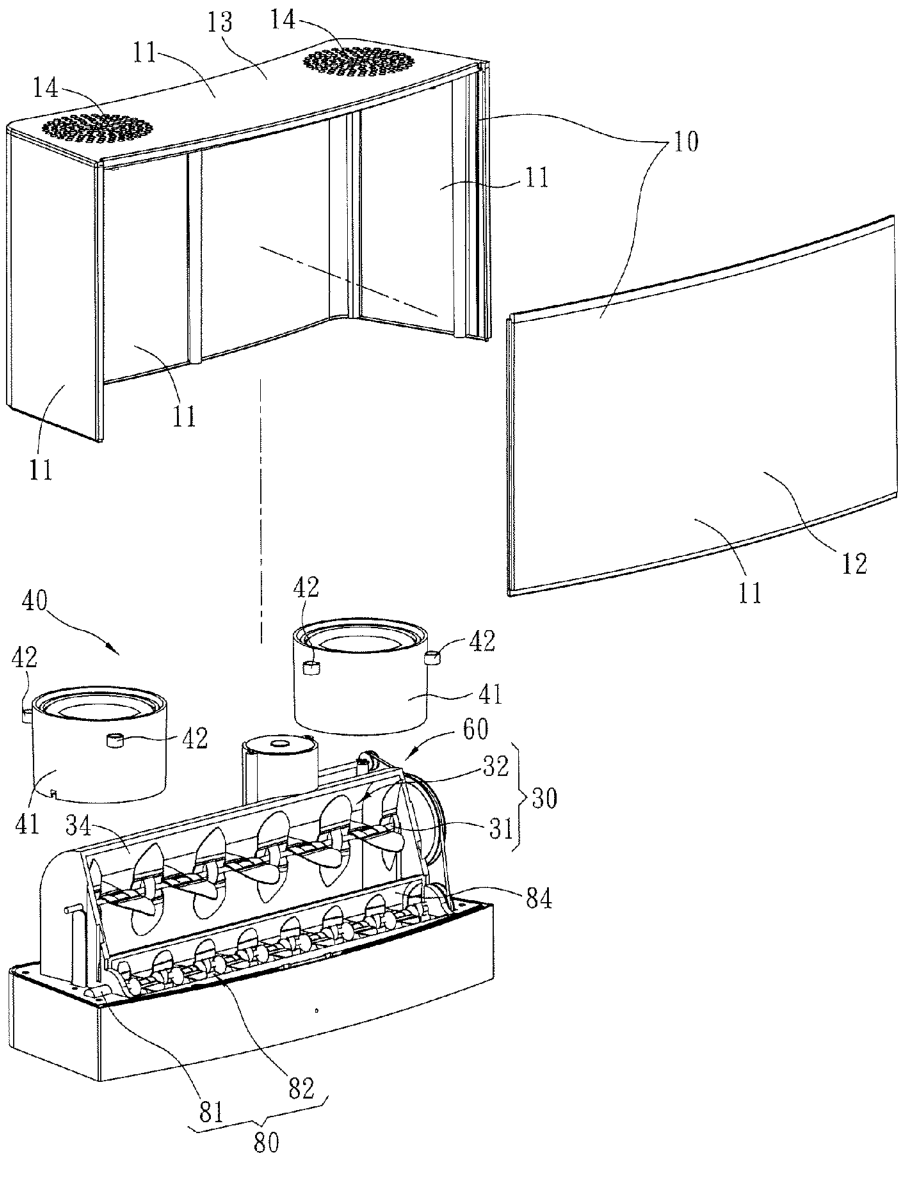
FIG. 2 is an explosive view of the embodiment in FIG. 1 according to the present invention.

Refer to FIG. 2 and FIG. 9, the audio unit 40 is set in the housing and used for playing music/sounds and output of an audio signal. The audio unit 40 includes at least one speaker 41 that is disposed with a plurality of locked parts 42 corresponding to and engaged with the locking parts 15 of the housing 10. By the locking parts 15 and the locked parts 42 engaged with each other, the housing 10 and the speaker 41 are connected to each other.

Refer to FIG. 3 and FIG. 4, the control unit 50 is mounted in the housing 10. The control unit 50 is used for receiving the audio signal and is including at least one control circuit. According to changes of the audio signal, the control unit 50 provides at least one drive signal to make the first light unit 20 emit light and drive the first rotating shaft 31 of the first reflection unit 30 as well as the first reflectors 32 to rotate. Thus the light is reflected to the display surface 12 by the first reflectors 32 and the light is shown on the display surface 12 in the flickering flame pattern. Moreover, the control unit 50 can be integrated with the LED light panel 21 so that the whole speaker becomes more compact.

As shown in FIG. 3 and FIG. 4, the drive device 60 is set in the housing 10 and connected to the first rotating shaft 31 of the first reflection unit 30 for driving the first rotating shaft 31 as well as the first reflectors 32 to rotate. The drive device 60 is further connected to the control unit 50 and is under control of the control unit 50. The drive device 60 is composed of a motor 61, a drive shaft 62 and a belt-driven pulley 63. One end of the drive shaft 62 is connected to the motor 61 while the other end of the drive shaft 62 is connected to the belt-driven pulley 63. Thereby the motor 61 drives the drive shaft 62 to rotate and then the belt-driven pulley 63 is driven to rotate by the drive shaft 62. Thus the first rotating shaft 31 and the first reflector 32 are further driven to rotate.

Refer to FIG. 3, the speaker with light flashing in the flickering flame pattern of the present invention further includes a second light unit 70 and a second reflection unit 80.

Still refer to FIG. 3, the second light unit 70 that emits light B is disposed in the housing 10. The second light unit 70 includes at least one LED light panel 71 with a plurality of LED lights to generate light with at least one color. The LED light panel 71 can be integrated with and connected to the control unit 50 so as to make the speaker become more compact.

Figure 7:
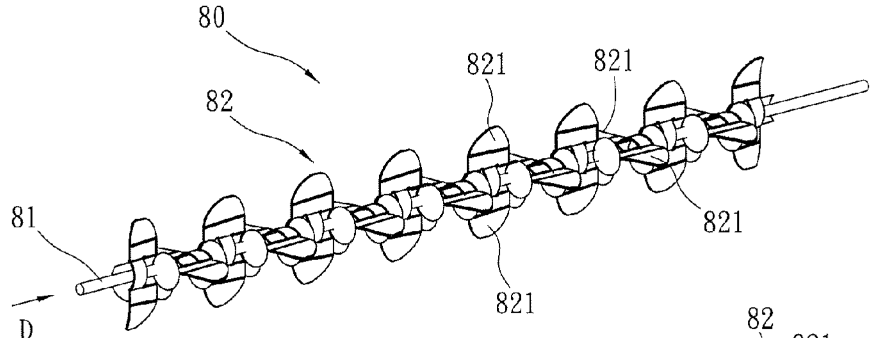
FIG. 7 is a perspective view of a second reflection unit of an embodiment according to the present invention.
Figure 8:
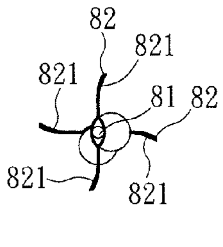
FIG. 8 is a side view of the second reflection unit in FIG. 7 viewed in the direction the arrow D indicates according to the present invention.

As shown in FIG. 3, the second reflection unit 80 arranged in the housing 10 includes a second rotating shaft 81 and a plurality of second reflectors 82. The second rotating shaft 81 is disposed on a second rack 83 and having a certain interval with the second light unit 70. For example, the second rotating shaft 81 can be set over the second light unit 70, but not limited to the position. The second reflectors 82 are arranged axially at the second rotating shaft 81 in a staggered pattern so that the second reflectors 82 are driven by the second rotating shaft 81 to rotate synchronously while the second rotating shaft 81 is rotated. The second rotating shaft 81 of the second reflection unit 80 is further connected to the belt-driven pulley 63 of the drive device 60. Thus the drive device 60 can drive the second rotating shaft 81 and the second reflectors 82 to rotate. As shown in FIG. 7 and FIG. 8, the arrangement of the second reflectors 82 are in a cross and alternate pattern viewed axially in the direction of the second rotating shaft 81. Each second reflector 82 includes at least one concave surface 821 used for reflecting light B emitted from the second light unit 80. The concave surface 821 is a concave mirror whose surface is curved inward. Thus the light B emitted from the second light unit 80 is reflected by the second reflector 82 to be displayed on the display surface 12 and flashing in the flickering flame pattern.

In the embodiment shown in FIG. 2, FIG. 3 and FIG. 4, the second rotating shaft 81 and the second reflectors 82 are arranged with an interval therebetween under the first rotating shaft 31 and the first reflectors 32. In other embodiments, the position of the second rotating shaft 81 and the second reflectors 82 and the position of the first rotating shaft 31 and the first reflectors 32 can be interchangeable. Moreover, the area of the reflecting surface (concave surface 821) of the second reflector 82 is different from the area of the reflecting surface (concave surface 321) of the first reflectors 32. The larger area of the reflector is, the larger area of the displayed light is. Thus the light flashing in the flickering flame pattern with different area is shown on the display surface 12 at the same time due to rotation of the first rotating shaft 31, the first reflectors 32, the second rotating shaft 81 and the second reflectors 82.

In order to prevent light interference between the light from the first light unit 20 and the light from the second light unit 70, and also to concentrate light on the corresponding reflector, a first light shield 34 is disposed outside the first reflection unit 30 and a second light shield 84 is arranged outside the second reflection unit 80, as shown in FIG. 2.

The first rack 33 and the second rack 83 can be arranged respectively. Or the first rack 33 and the second rack 83 can be integrated into one part and then assembled. Thus the manufacturing processes are reduced and the assembly efficiency is improved. The reduced number of components makes materials management more convenient.

The audio unit 40 plays music and outputs of an audio signal while in use. The control unit 50 receives the audio signal and provides at least one drive signal to make the light unit emit light and drive the rotating shaft of the reflection unit as well as the reflectors to rotate. The light unit can be the first light unit 20 and/or the second light unit 70 while the rotating shaft of the reflection unit can be the first rotating shaft 31 of the first reflection unit 30 and/or the second rotating shaft 81 of the second reflection unit 80. The reflectors can be the first reflectors 32 or the second reflectors 82. Thus the light reflected by the first reflectors 32 and/or the second reflectors 82 is shown on the display surface 14 and is flashing in the flickering flame pattern. The surface area of the second reflectors 82 (concave surface 821) is different from the surface area of the first reflectors 32 (concave surface 321). Thus two different flickering flame patterns are formed on the display surface 12. The above audio signal also changes when the music tempo changes. Under control of the changed audio signal, the LED light panel 21 of the first light unit 20 and/or the LED light panel 71 of the second light unit 20 generates light in different colors. Moreover, the light flashing in the flickering flame patterns with different area is generated by the first reflection unit 30 and/or the second reflection unit 80.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A speaker with light flashing in a flickering flame pattern comprising:

a housing having at least one display surface which light is able to pass through and show thereon;

a first light unit arranged in the housing and used to emit light;

a first reflection unit that is arranged in the housing and having a first rotating shaft and a plurality of first reflectors; wherein the first rotating shaft and the first light unit are disposed with an interval therebetween; the first reflectors are disposed axially on the first rotating shaft in a staggered pattern so that the first reflectors are driven by the first rotating shaft to rotate synchronously while the first rotating shaft is rotated;

wherein the light emitted from the first light unit is reflected by the first reflectors to be displayed on the display surface and flashing in the flickering flame pattern;

an audio unit set in the housing, used for playing music, sounds and output of an audio signal; and a control unit disposed in the housing, used for receiving the audio signal and providing at least one drive signal according to changes of the audio signal to make the first light unit emit light and drive the first rotating shaft as well as the first reflectors to rotate; wherein the light from the first light unit is reflected to the display surface by the first reflectors to be shown in the flickering flame pattern.

2. The device as claimed in claim 1, wherein the first reflectors are disposed alternately in a cross pattern viewed axially along the first rotating shaft.

3. The device as claimed in claim 1, wherein the first reflector includes at least one curved surface that is a concave mirror used for reflecting the light.

4. The device as claimed in claim 1, wherein the speaker further includes a drive device; the drive device is disposed in the housing and connected to the first rotating shaft for driving the first rotating shaft to rotate; the drive device is further connected to the control unit and is under control of the control unit.

5. The device as claimed in claim 1, wherein the speaker further includes a second light unit mounted in the housing and used to emit light; and a second reflection unit that is disposed in the housing and having a second rotating shaft and a plurality of second reflectors; wherein the second rotating shaft and the second light unit are arranged with an interval therebetween; the second reflectors are disposed axially on the second rotating shaft in a staggered pattern so that the second reflectors are driven by the second rotating shaft to rotate synchronously while the second rotating shaft is rotated; wherein the light emitted from the first light unit is reflected by the second reflectors to be displayed on the display surface and flashing in the flickering flame pattern;

wherein the control unit provides at least one drive signal to make the second light unit emit light and drive the second rotating shaft of the reflection unit as well as the reflectors to rotate; wherein the light from the second first light unit is reflected to the display surface by the second reflectors to be shown in the flickering flame pattern.

6. The device as claimed in claim 1, wherein the first light unit includes at least one light emitting diode (LED) light panel disposed with a plurality of LED lights.

7. The device as claimed in claim 1, wherein a top surface of the housing is arranged with sound apertures and a plurality of locking parts is disposed on an inner side of the top surface of the housing; the audio unit includes at least one speaker; the speaker is disposed with a plurality of locked parts; the locked parts are corresponding to and engaged with the locking parts.

8. The device as claimed in claim 2, wherein the first reflector includes at least one curved surface that is a concave mirror used for reflecting the light.

9. The device as claimed in claim 5, wherein the second reflectors are arranged alternately in a cross pattern viewed axially along the second rotating shaft.

10. The device as claimed in claim 5, wherein the second reflector includes at least one curved surface that is a concave mirror used for reflecting the light.

11. The device as claimed in claim 5, wherein the second rotating shaft, the second reflectors, the first rotating shaft and the first reflectors are disposed horizontally with an interval therebetween; surface area of the second reflector is different from surface area of the first reflectors.

12. The device as claimed in claim 9, wherein the second reflector includes at least one curved surface that is a concave mirror used for reflecting the light.

* * * * *